Dec. 14, 1943. G. DAVENPORT 2,336,849
CUTTER STOP FOR MACHINE TOOLS
Filed July 19, 1940 3 Sheets-Sheet 1

INVENTOR
Granger Davenport
BY
Albert F. Nathan
ATTORNEY

Dec. 14, 1943.   G. DAVENPORT   2,336,849
CUTTER STOP FOR MACHINE TOOLS
Filed July 19, 1940   3 Sheets-Sheet 3

INVENTOR
Granger Davenport
BY
Albert F. Nathan
ATTORNEY

Patented Dec. 14, 1943

2,336,849

UNITED STATES PATENT OFFICE 2,336,849

CUTTER STOP FOR MACHINE TOOLS

Granger Davenport, Montclair, N. J., assignor to Gould & Eberhardt, Newark, N. J., a corporation of New Jersey Application July 19, 1940, Serial No. 346,283

22 Claims. (Cl. 90—15.1)

The present invention relates to metal cutting machines and more particularly to machines for the cutting of splines, serrations and analogous types of forms in the surface of a workpiece, and has for a primary objective to eliminate scoring of the finished form by the cutting tool as it back tracks over the workpiece.

In the cutting of fine pitched serrations on cutter blades, for example, considerable difficulty has heretofore been encountered in forming the grooves in the blades with that high degree of precision required to render such blades capable of insertion and of being tightly clamped in complementary shaped slots in cutter bodies. In such uses the serrations on the blades must be extremely accurately formed to permit of frequent readjustment for wear and firm reclamping in the body, and also to permit ready interchangeability as to render blade replacement a simple and inexpensive matter.

In single point and multiple blade types of inserted blade tools the serrations are relatively closely spaced, approximately 16 to the inch and some times finer, approximately 32 to the inch, and each must be accurately formed to properly match with those formed in the holder or body of the tool in which they are used, in any laterally offset position. Moreover, each serration must also be of the same depth throughout and have the same degree of slope to its sides so that the blade may slide without rocking along the serrations until it reaches its clamped position in the cutter body.

These and other problems incident to special shapes and styles of insertable metal cutting bits confront the manufacturer and heretofore attempts have been made to form the serrations by grinding or by broaching. The former method was quite expensive to practice because of the time involved in grinding a series of serrations in the blade or part and required expensive machines that were costly to operate and maintain. The practice of broaching the serrations was also unsatisfactory because it again was a slow operation requiring a number of passes of the broaching tool and reshimming of the work before the full depth was reached, and in addition, required an elaborate set-up of jigs and fixtures to hold each style or shape piece to be serrated.

The aim of the present invention is to avoid the difficulties just mentioned and to form the serrations in a relatively expeditious, simple and non-complex manner. To those ends, this invention proposes an apparatus and process for cutting serrations and similar toothed forms in a manner similar to a milling operation, but unlike milling operations, in that the cutter is back tracked through the groove or grooves that have been finished cut without scoring or otherwise deforming the finished surfaces.

The invention further aims toward a method of cutting one or a series of parallel grooves in workpieces by a substantially automatic and continuous process which requires the operator only to load the machine with new work blanks and to unload therefrom the finished pieces during the time the machine is automatically performing the tasks of indexing workpieces to the tooling stations, starting the cutter rotation and travel relative to the blank, back tracking a stopped cutter through the finished piece, and continuously repeating the cycle until the machine is brought to rest.

A further objective of this invention is to render available a device for bringing a tool, such as a rotary cutter, to a practically instantaneous stop after it completes a pass over or through a workpiece and automatically to start the tool rotating again after the workpiece or the tool has been retracted to the place of starting. By stopping cutter rotation after it has completed the cut in the blank, the stationary cutter may be traversed through the newly cut grooves without scoring or otherwise deforming their shape.

Still another aim of the invention is to effect the above mentioned instant stopping of the cutter and thereafter an automatic starting thereof when it assumes a predetermined position with respect to the work, by a simple inexpensive mechanism that does not involve clutches or mechanical reversers or any of the many difficulties such as gear clashing, timing of movements, etc., encountered with the usual reversible or interruptable gear drives.

Still another object of the present invention is to isolate the tool feeding and work indexing drive trains from the tool driving train. By so separating the drives, two or more prime movers may be employed, each of which has a horsepower rating economically best adapted for the particular work to be done or for the train of mechanisms it drives. It has been the practice heretofore to propel the several elements such as the cutter, feed, index trains, etc., of a machine with a single motor and where, as in the instant example, certain of the trains of mechanisms stand idle during a portion of the machine cycle, the continuous operation of various shafting and gearing meant continuous wear on vital parts and a wasteful or purposeless consumption of power. This invention further aims to eliminate such idle wear and to conserve the heretofore wasted power and proposes to divide the work between two or more trains of mechanism each separately propelled to the end that the part time idle train and prime mover may be shut off or disconnected from the source of power during the period the element propelled thereby stands idle. Meanwhile, the other operating train or trains of mechanisms are being propelled by their respective motors or prime movers each having a power capacity adequate for their individual functions.

For convenience in obtaining a better understanding of the inventive concept, the invention will be exemplified in connection with a machine which in some respects may be likened to a gear cutting machine, yet differing therefrom in many important aspects as will hereinafter appear. It will also be understood that the invention is equally applicable to other machine tools and tooling operations wherein similar conditions exist.

In the instant example, a gear cutting machine or the like is provided with an indexible rotary work carrier and a cutter carrier that moves relative to the work, usually in a direction axially of the work. The cutting tool is power rotated as it is fed along the work surface and at the completion of the cutting stroke, the cutter is brought to a dead stop and is then retracted, while stopped, through the finished cut to the point of starting. At that point in the cycle, the work carrier is then indexed, to bring a new portion of the work into the tooling position, and the cutter rotation again initiated, followed by a forward feed movement. All motions are automatically timed and properly correlated with each other to effect continuous automatic operation.

Without the bringing of the cutter to a dead stop prior to its return movement such a machine is not, however, suitable for the present task of cutting a series of fine serrations or grooves in the surface of a flat workpiece, for the back tracking of a rotating cutter through a cut groove would, because of inevitable backlash in the various drive trains, destroy the accuracy of the machined grooves and render the part unfit for use.

With the aid of this invention, however, certain of the drive trains are isolated from each other and may be stopped or started at will, thus, not only conserving power, but rendering it feasible to stop the cutter movements at a given point in the cycle without resort to complex mechanism clutches, tripping devices, and the like to the end that a stationary cutter may be back tracked over the work thereby preventing the scoring or the mutilating of the finished surface.

In the cutting of fine serrations in flat surfaces, the cutting of such surfaces free of defects is of vital importance for the slightest movement or weave of the cutter during the back tracking operation will destroy the alignment of the grooves, their sloping sides, or the tops or bottoms of the V's and render small but expensive parts useless for their intended purposes.

In attaining the objectives of this invention, the cutter must not be allowed to "coast" to a stop, but the stopping must be practically instantaneous and occur after the cut is completed and before the return travel gets under way, and this invention proposes a novel way of stopping the rotary motion of the cutter practically instantaneously at the completion of each tooling pass. By employing a cutter drive train of mechanisms completely separate and independent of the feed and index trains, the cutter train may in the manner hereafter more fully explained, be instantly stopped without interference with the functioning of related and coordinated trains of mechanism in the machine.

To the end that mechanical clutches, brakes, trip devices and other complex control instrumentalities and their attendant problems and difficulties are eliminated, this invention further proposes to accomplish the quick stopping of the cutter and drive train by using the electromotive force of the motor itself and to effect the desired result by automatically plugging the cutter drive motor in reverse simultaneously with the tripping out of the cutter forward feed motion, and instantly thereafter cutting out the reversing function the moment the motor shaft begins to move reversely. That is to say, the invention proposes to effect a quick stopping of the cutter by presetting the motor in reverse, and to initiate that action by a distance factor or instrumentality placed in motion by another train of mechanisms, and to complete the action of stopping, (of the first mentioned train) by devices responsive to a motion factor of the train being stopped. By properly coordinating these factors, the stopping of the cutter spindle will not be initiated until the cutter reaches a given position relative to the work, whereupon the automatic reverse plugging of the motor acts somewhat as an electrical brake on the forward motion and brings the cutter to a quick stop. The moment, however, forward motion of the motor ceases, and motion in the reverse direction starts, the cutter drive mechanism automatically and instantly cuts off the power and the entire cutter drive train is stationary and remains so until the retracting movement of the cutter is completed.

At this last mentioned point in the cycle, the index movement of the work is automatically instituted and the cutter slide does not start its advance toward the work until the work indexing movement is completed. With such an arrangement cutter rotation, feed, and work index motions are not only mutually dependent upon one another, but one of the drive trains of mechanism, namely, the cutter driving train, is dependent upon motion within itself for completion of the stopping function that was instituted or set in motion by mechanism responsive to the action of another train.

With such a relationship of parts, two or more motors may be used in the organization each designed and adapted for a specific purpose or use, and upon each of which the work load remains substantially uniform throughout its period or cycle of use. No motor or train, in an organization constructed in accordance with the principles of this invention, is arranged to carry widely different or varying loads intermittently, and as a direct result each motor train may be operated at its most efficient and economical rate.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figures 1, 3:
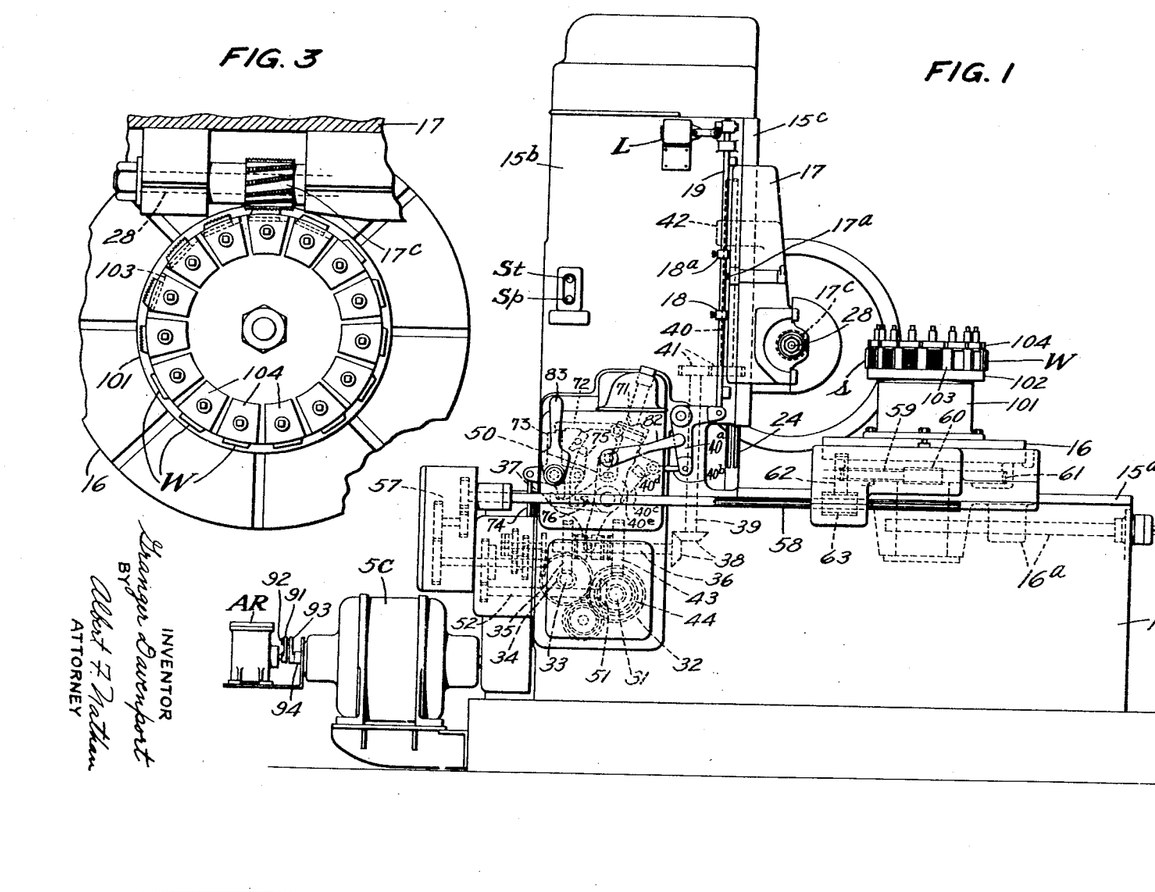
Figure 1 of the drawings is an elevational view of a serration cutting machine embodying this invention.
Fig. 3 is a plan view of a portion of the cutter slide and indexible work fixture.

Referring more particularly to Figure 1 of the drawings the invention is shown embodied in a representative type of machine, namely, a gear cutter in some respects similar to the machine disclosed in Pat. No. 1,033,857 to which reference may be made if desired for further information in respect to certain details which do not per se form the essence of the present invention.

In the instant machine there is a base member 15 providing guides 15ª for supporting and guiding a laterally adjustable and indexible work carrier 16. Uprising from the base there is also a vertical stanchion 15ᵇ providing guides 15ᶜ for supporting and guiding a vertically movable cutter slide 17. The slide 17 mounts a rotating cutter 17ᶜ and, assuming that the workpiece W is properly positioned with respect to the line of vertical movement of the cutter, a downward feed movement of the cutter will cause the cutter to perform a tooling operation upon the surface of the workpiece. When the tooling operation has progressed to the point desired (usually the full axial distance of the work) a manually withdrawable latch member 17ª mounted on the tool slide engages an adjustable dog 18 on a trip rod 19 and by mechanism more fully explained in said patent, causes the cutter slide to be retracted. Thereafter the work table indexes to a new position and the cycle is repeated. The foregoing briefly explains the cycle of the conventional machine, which, for reasons above set forth is wholly unsuited for the performance of the tooling operations that are achieved by the present invention.

Figure 2:
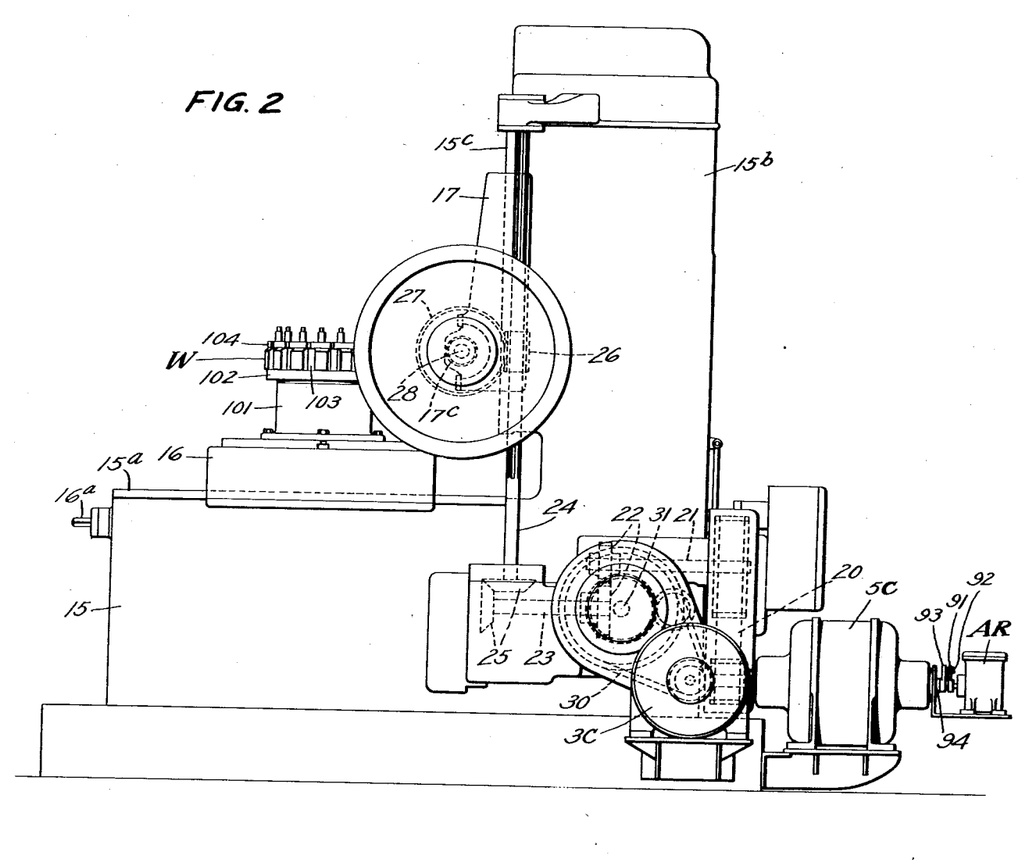
Fig. 2 is an elevational view of the opposite side of the machine illustrated in Fig. 1.

In attaining the present objectives, the drive to the cutter 17ᶜ is completely separate and distinct from the cutter feed mechanisms and work index mechanisms. This isolation of mutually dependent trains of mechanisms is illustrated more clearly in the diagrammatic Fig. 4 of the drawings. In this figure a 5 H. P. motor 5C, through a multiple belt connection 20 drives a horizontally disposed shaft 21 journaled in the base of the machine. At its end, a pair of change gears 22 transmits the power to a parallel shaft 23 which in turn transmits the motion to a splined vertical shaft 24 through bevel gearing 25 (Fig. 2). Journaled in bearings provided by the tool slide, a worm 26, slidable on the splined shaft 24 transmits the power to a worm wheel 27 mounted upon the cutter spindle shaft 28. There are no branch transmissions deriving power from the motor 5C and its sole and entire function is to propel the cutter 17ᶜ.

The feed and index motions of the cutter slide and work table are derived from a second motor 3F, which may be of lower power than the motor 5C because of relatively smaller load or demands made thereon. The feed motor 3F, through a multiple belt connection 30 continuously propels a shaft 31 (Figs. 1 and 4) which is common to the feed and to the index trains. With respect to the feed mechanisms, a set of change gear elements, indicated generally at 32, transmit the power to a worm shaft 33 and a worm 34 thereon transmits the motion to a worm wheel 35 mounted loosely on a shaft 36. The worm wheel 35 is, in part, a clutch element and when a clutch spool 37 is shifted to the left in these figures, the worm wheel is locked to the shaft 36 and the latter is driven thereby at a relatively slow rate. The shaft 36 transmits the power through a pair of bevel gears 38 to a vertically extending shaft 39 journaled in the stanchion. At its upper end a pair of gears 41 transmit the motion to a vertically extending screw threaded shaft 40, upon which travels a cooperating nut 42 secured to an extending portion of the cutter slide 17. Through the train of elements just described, the cutter slide may be fed slowly downward toward and past the workpiece. When, however, the end of the downward feed is reached, as determined by the setting of the adjustable dog 18, the trip rod 19 is operated and which, through the clutch control mechanism 50, effects a shifting of the clutch spool 37 to the right (in Figs. 1 and 4) into engagement with the clutch teeth on the helical gear 43. The tripping mechanism operates as follows: When the rod 40 is actuated downwardly the bell crank 40ª, link 40ᵇ, and lever 40ᶜ are moved to the left. The lever 40ᶜ is loose on the clutch shaft and a lug 40ᵈ thereon picks up and actuates a lever 40ᵉ keyed on the clutch shaft. When the lever 40ᵉ is pushed to the left, the crest of a cam plate thereon rides past the lower end of a plunger 71. Meanwhile a hooked lever 72, pivoted to the lever 40ᶜ, also moves to the left and engages with the stepped end of a lever 73. The helical gear 43 meshes directly with a companion gear 44 secured to the common drive shaft 31. The slow drive to the feed screw 40 through the change gearing 32 and worm and worm wheel 34, 35 is thus disconnected and a faster drive in the opposite direction is established, and the cutter slide is thereupon retracted at a relatively rapid rate.

Figure 4:
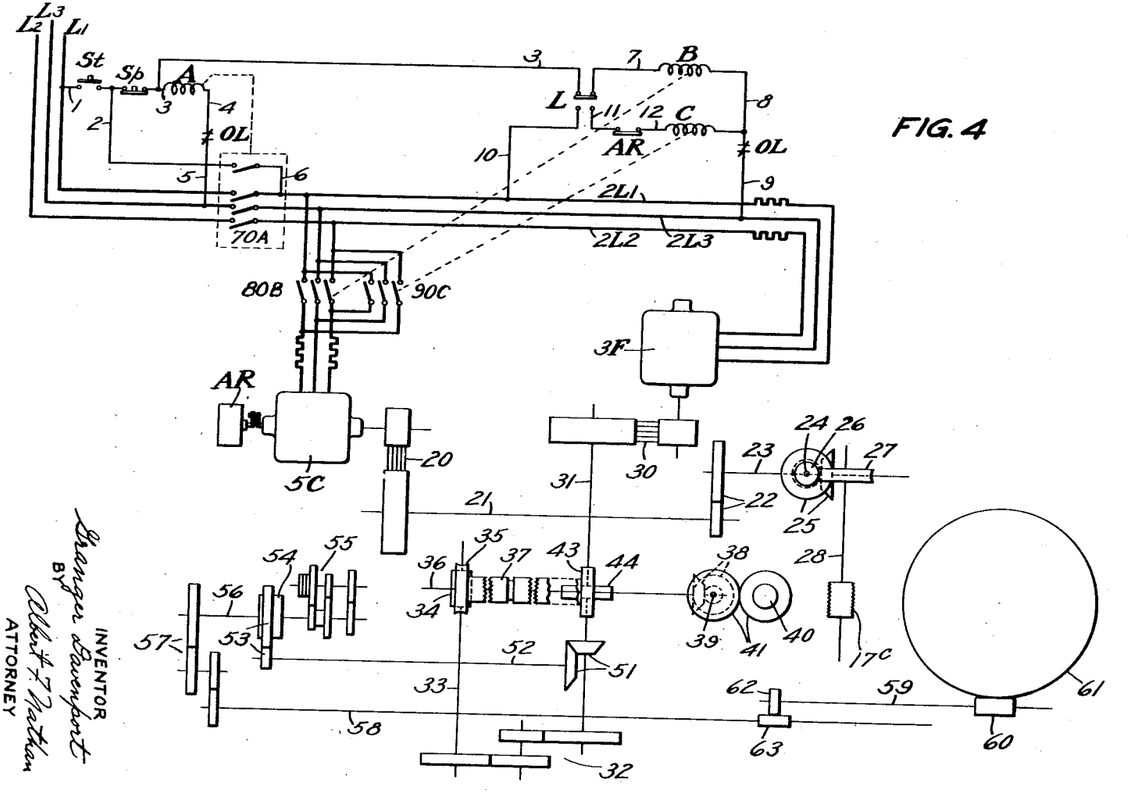
Fig. 4 is a schematic diagram of the two drive trains and their interrelated control circuits and controlling mechanisms.

When the cutter slide reaches its upward limit, the rod 40 is operated upwardly, thus moving parts 40ª, 40ᵇ, 40ᶜ, in the reverse direction, and the clutch 37 is moved to a neutral position. The lost motion between levers 40ᶜ and 40ᵉ provide for such action. Meanwhile the hooked lever 72 operates the lever 73 clockwise and elevates an index control rod 74 to start the table index movements. The work index train of mechanism comprises a pair of bevel gears 51, which derive power from the drive shaft 31, and shaft 52, gears 53 and an index start and stop clutch 54. Associated with the start and stop clutch is a revolution counter 55 which operates to disengage the clutch 54 when the work table has been moved through a predetermined arc. When the clutch is engaged, however, the power in shaft 52 passes to shaft 56, through index change gearing 57 to table index shaft 58. A similar shaft 59 forms a continuation of shaft 58 and carries an index worm 60 that meshes with and drives the table mounted worm wheel 61. Index shafts 58 and 59 have a splined connection with a connecting gear and pinion 62, 63, to facilitate the making of work table adjustments toward or away from the cutter slide as by means of the hand screw and nut mechanism 16ª.

The construction and operation of the start and stop clutch 54 and counting mechanism 55 is similar to the mechanisms of Patents No. 909,126 and No. 1,033,857 and the reference to such mechanism here is only for the purpose of illustrating one of many possible forms of index control that would be appropriate for the instant purpose. As previously explained, the trip bar 19 is again actuated upwardly at the end of the cutter slide return movement and clutch spool 37 is moved to and held in a neutral position; also the movement of the trip bar 19 sets the index clutch 54 in operation and the table indexes. When, however, the table index movement is completed, as determined by the setting of the counter 55, the index clutch 54 is again disengaged and simultaneously the feed clutch spool 37 is thrown from neutral to its feed position. The throwing of the clutch spool 37 to forward feed position is initiated by the downward movement of the rod 74 (which occurs at the end of the table index movement). The downward movement of the rod 74 moves the lever 73 counterclockwise, thus elevating a lever 75 pivoted to another arm thereof. The lower end of the pivoted lever 75 is notched to engage a lever 76 that projects laterally from the clutch lever 40e and operates the latter in a clockwise direction a distance sufficient to cause the crest of its cam to ride past the plunger 71 and thus complete the throwing of the feed clutch 37 into forward feed position. Hand levers 82 and 83 are also provided to enable the operator to control the feed and index mechanisms manually when desired.

Having thus explained the essential mechanisms of the respective drive trains, the mechanism for effecting a quick stopping of the cutter 17c at the end of the forward feed stroke will now be explained. The quick stopping is, as above mentioned, accomplished electrically and Fig. 4 of the drawings illustrates diagrammatically a preferred combination of elements, their connections and the controlling circuits for effectuating that result. While A. C. motors and circuits have been illustrated, it will be understood that the invention may also be carried out with respect to D. C. motors using equivalent circuit and control instrumentalities for the purpose. In this Fig. 4, numeral 70A represents a main electromagnetic switch which controls the feed and index motor 3F. Normally this main switch is self-opening and is closed only when the solenoid A is energized. The solenoid is arranged to be connected across main lines L1 and L3 and when the start button St is depressed, the energizing circuit is from L1, line 1, switch St, line 2, normally closed switch Sp, line 3, solenoid A, line 4, overload switch OL, line 5 to line wire L3. The main switch 70A thereupon closes and motor 3F starts operating. Simultaneously with the closing of the main switch 70A, a holding circuit for the solenoid A is established through line L1, 6, main switch auxiliary contacts, line 2, stop switch Sp, line 3, solenoid A, etc., so that a release of the start button St will not of itself stop the motor 3F. After the holding circuit is established, the motor 3F may be stopped only by pressing the stop button Sp which opens the holding circuit across lines 2 and 3.

The cutter drive motor (5C) circuit and control, connects with the main power lines on the motor side of the main switch 70A; this is so that the cutter 17c will be driven only when and if the other machine elements are in operation.

The cutter drive motor 5C is, in this illustration of the invention, reversible and its control circuit includes a forward switch 80B and a reverse switch 90C, each self-opening and operated by solenoids B and C respectively.

When the start button St is pressed, a circuit is also made from L1, line 1, switch St, line 2, switch Sp, line 3, limit switch L (which is closed), line 7, solenoid B, line 8, overload switch OL, line 9, to line 2L3. It will be observed that this circuit is completed and the motor 5C set in motion, only if the main switch 70A is closed, and the same holding circuit previously referred to, and which is established by the closing of switch 70A, also holds the forward switch 80B of motor 5C closed. Both motors are stopped if the stop button Sp is pressed.

Assuming that the tool slide is now feeding toward the work, the feed continues until the dog 18 on trip rod 19 is engaged and operated as hereinbefore explained, whereupon reverse translation of the tool slide commences. Simultaneously, however, the trip rod 19 operates the limit switch L (Figs. 1 and 4) and causes an opening of the circuit across lines 3 and 7 and a closing of a circuit across lines 10 and 11. The opening of this portion of the circuit effects only solenoid B and the instant the circuit for solenoid B is broken, the motor forward switch 80B opens. Simultaneously, however, the limit switch L closed the circuit across lines 10 and 11 and the solenoid C becomes energized and closes the motor reverse switch. This last named circuit is from 2L1, line 10, switch L, line 11, switch AR (normally closed), line 12, solenoid C, line 8, overload switch OL and line 9 to line 2L3. Again it will be seen, the reversing circuit for motor 5C is not complete unless the switch 70A for motor 3F is closed.

The cutter drive motor may in this way be preset or conditioned for reverse operation, whereupon it acts as a definite brake upon the forward momentum or forward inertia of the moving parts. Accordingly, forward motion of the cutter 17c quickly ceases and as the motor remains for the moment in reverse, reverse motion of the motor and cutter ordinarily would follow. However, as reverse rotation of a cutter is as harmful on the fine grooves just cut as forward rotation thereof, this invention further proposes a motion stopping arrangement which in the instant case is in the form of an anti-reverse switch AR connected in series with the control circuit of the reverse solenoid C, which functions primarily as a motion stopping circuit or means.

The switch AR is preferably mounted adjacent the shaft of motor 5C and includes a set of contacts operated from a rotary arm 91. The arm 91 carries a pin 92 which engages in a slot provided in an arm 93 secured to the shaft 94 of the motor 5C. This switch AR is so constructed that so long as its shaft is rotated in one direction the electrical circuit across lines 11 and 12 (indicated in Fig. 4 of the drawings) is made and maintained, but instantly breaks that circuit when its shaft starts to move or is rotated reversely. Therefore, the moment the cutter motor starts to move in the reverse direction, the control circuit to the solenoid C is opened, instantly the reverse switch 90 also opens, and there is no motion whatever in the cutter or cutter drive train at the time the cutter is retracted along the finished grooves to its position of starting.

By arranging the anti-reverse switch AR so as to be directly responsive to the motion of the cutter drive motor 5C, the angular movement of the switch from closed to open position, or conversely, may be as much as 20°. However, by virtue of the speed reducing gearing in the cutter drive train, the actual movement of the cutter 17c in an angular direction incident to a 20° reverse operation of the motor is, for all practical purposes, a negligible amount.

The anti-reverse switch is, per se, a commercial article manufactured by the General Electric Company and adapted to the needs of this invention and need not, it is believed, be described in further detail.

It will be understood that the act of bringing the tool spindle to a stop occurs with great rapidity, and by the time the return travel of the cutter slide has carried the cutter to the point of re-entering the workpiece, the cutter will have ceased rotating and is back tracked across the work while in a stationary non-rotating condition. As a direct consequence the side walls, apexes, valleys, etc., of the grooves machined in the workpiece are not scored, deformed or mutilated in any way and the production cycle is measurably accelerated. Moreover, by traversing a stationary tool along the finished piece, additional complications as shifting the work laterally, destroying center distances, and other attendant disadvantages of work or tool shifting, are eliminated.

The cutter slide proceeds upwardly (carrying the stationary cutter through and past the workpiece) until the latch 17a engages a second dog 18a on the trip rod 19. Continued upward movement of the tool slide then lifts the trip rod and, by virtue of the linkages and connections heretofore referred to, operates the feed clutch spool 37 to its neutral position (stopping slide travel) and simultaneously operating the feed clutch 54 which starts the work indexing mechanisms in motion. The upward movement of the trip rod 19 also operates the limit switch L to a position closing the circuit (to solenoid B) across lines 3 and 7 and opening the circuit (to solenoid C) across lines 10 and 11. Solenoid B thereupon is again energized and forward motion of motor 5C and of the cutter 17c, is again instituted. Forward motion of the motor also restores the anti-reverse switch AR to a position closing the circuit across lines 11, 12 so as to recondition that part of the circuit to the reversing solenoid, for operation when the limit switch L is again operated to close the circuit across lines 10 and 11.

The limit switch L is not of the self-opening character, but is on the order of a snap switch which maintains the circuit closed, upon movement of its actuating lever to an effective position, in either direction, with provision for an over travel of the actuating arm if necessary. Fig. 1 illustrates a preferred location of the limit switch and its actuating means with respect to other machine elements.

After the work indexing movement is completed the indexing clutch 54 is disengaged, the cutter feed clutch 35—37 is engaged and the cutter, which is now rotating in a cutting direction, feeds slowly toward the new workpiece, and the tooling cycle continues as before, namely, cutter down feed, cutter (rotation) stop, cutter back travel, cutter (rotation) start, work index, cutter down feed, etc. This automatic cycle continues until it is desired to stop the machine which may be done at any time merely by pressing the stop button Sp which opens all main and controlling circuits.

In the cutting of multiple series of serrations, grooves, splines, etc., in parallel relation and in flat surfaces, it is important to use a cutter having multiple series of forming teeth properly spaced therealong. The teeth in each set or section of the cutter lie in the same plane, that is, there is no helical lead to the teeth of the present cutter as is found in a hob. A hob form of cutter is entirely unsuited for the present operation of cutting parallel serrations, or the like, in flat surfaces and where the work must be indexed from station to station. In hobbing operations the work continuously moves angularly about a center and the hob has a pitch or lead to its teeth and progressively operates all the way around a circular work-piece as it is slowly fed downwardly.

With the present invention, the entire surface of the workpiece, which may be of substantial width, is completely machined in one pass of the rotating cutter, and the accuracy of the spacing of the serrations, their form, depth, etc., is the counterpart of the accuracy built into the multiple cutting tool in the first instance, which indeed will be the ultima of perfection.

The work holding fixture which forms part of the present organization, is disclosed more particularly in Figs. 1 and 3 of the drawings and comprises a standard 101 which is centered upon and bolted to the indexible table 16. The standard 101 supports at its upper end an annular flange member 102, on top of which the workpieces W rest and are clamped. Inwardly from the outer edge of the flange 102, an annular series of work backing facets 103 are provided each of which is overlayed by an independently operable clamp shoe 104.

In the present example, the workpiece to be serrated is a milling cutter blade that is tapered lengthwise (and which may also be tapered transversely), and the work backing facets 103 are each sloped vertically (and/or laterally as the work requires) so that the surface s of the workpiece lies in a plane paralleling the line of feed movement of the cutter 17c, and also parallel to its axis, as illustrated in plan view in Fig. 3, when the work is in the tooling station.

In the work fixture illustrated, fifteen work supporting stations are provided which gives the operator ample time to unclamp and take out finished pieces and insert new blanks, while other blanks are being operated upon. By providing a multiple toothed forming cutter of an axial length greater than actually required for the width of the surface to be serrated, the operator is given considerable latitude in respect to the lateral location of each blade when clamped in the fixture. In the event that the blades have a transverse or a compound taper, appropriate guides and stops may be provided adjacent each blade station to facilitate proper location on clamping. Such guides or stops may also be employed with any type of blade or workpiece to insure the cutting of the serrations at a predetermined point or region laterally of the width of each blade or workpiece.

With the present work fixture and method of cutting the serrations, the unfinished work blanks may vary somewhat in thickness and/or in taper. However, by locating the plan where the serrations are to be cut, definitely with respect to the work backing facets 103, which in turn are accurately spaced from the work table center, and that center accurately adjusted and clamped relative to the cutter axis, any excess in material on the respective blades projects into the path and plane of the cutter travel and is removed thereby. In consequence, all blades are finished uniformly in thickness and in taper, simultaneously with the cutting of the serrations thereon. Undersized blades will, of course, be weeded out on inspection.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a gear cutting machine or the like, the combination of two electric motors one of which is reversible and directly connected with the cutter spindle for rotating same, and the other of which is connected with the cutter slide for feeding the cutter to and from the work alternately; a starting switch for controlling the starting of the forward motion of both of said motors concurrently; means for quickly stopping said cutter driving motor independently of the cutter feed motor when said cutter has been fed by the latter motor to a predetermined position, said means including a reversing switch for the said cutter rotating motor, an auxiliary switch actuated at a given point in the movement of the cutter slide for rendering the effect of the closing of the said starting switch on said cutter rotating motor ineffective and simultaneously said reversing switch effective, and means including a third switch connected in series with said auxiliary switch for opening the said reversing switch the instant said reversing motor starts to rotate reversely.

2. A machine tool having in combination a reversible tool rotating motor and a tool feeding motor, a pair of main switches for starting the forward operation of each of said motors, means including a third switch and controlling circuit for effecting closing of said two main switches concurrently, means for stopping the rotation of the tool rotating motor independently of the feed motor, said means including a motor reversing main switch, solenoid means for actuating same, a control circuit for said solenoid including a double pole double throw limit switch serially connected in the circuit of said third switch and normally effective to complete the starting circuit established by the closing of said third switch to said tool rotating motor, said double pole double throw switch also having a pair of normally open contacts serially connected in the circuit to said solenoid means of said reversing switch, means actuated by the motion of the tool feeding motor for throwing said limit switch to a position to effect the converse closed and open relation of the circuits referred to whereupon said reversible motor is immediately plugged in reverse; and means for opening said reversing solenoid circuit the instant said motor begins reverse rotation.

3. In a machine tool the combination of two electric motors one of which is reversible and directly connected with an element to be driven, and the other of which is connected with a second element to be driven; magnetically operated switches for each of said motors, a starting switch for effecting actuation of the magnetic switches of both of said motors concurrently; means for quickly stopping said reversible motor and element driven thereby independently of the movement of the other of said motors and driven element, said means including a magnetic reversing switch for said reversible motor, an auxiliary switch for rendering the first mentioned magnetic switch of the reversing motor ineffective and simultaneously said reversing magnetic switch effective, means operatively connected with said auxiliary switch and actuated by and at a preselected point in the movement of said second element for actuating said auxiliary switch; and means actuated by said reversible motor for opening said reversing switch the instant said motor starts to turn reversely.

4. In a machine tool the combination of two electric motors one of which is reversible and directly connected to rotate an element, and the other of which is connected to translate said element, means including a starting switch for controlling the starting of the forward motion of both of said motors concurrently and means for quickly stopping said element rotating motor independently of the element translating motor when said element has been translated by the latter motor to a predetermined position, said means including a normally open reverse switch for said reversible motor, mechanism actuated by the translating motion of said element for closing said reverse switch and for rendering ineffective the means for starting the forward motion of said reversible motor, and an auxiliary means actuated by said element rotating motor for again opening said reverse switch the instant said reversible motor starts to rotate reversely.

5. Control mechanism for quickly stopping one of two motors of a machine tool organization connected in parallel comprising a first motor and a reversible second motor, main power lines leading to the first of said motors, a main motor control switch in the lines ahead of the first motor, subordinate power lines leading to the reversible second motor and connected to said main switch on the motor side thereof, a reversible switch in said subordinate power lines for the reversing motor, means for closing said main switch and said reversing switch concurrently whereby both motors start operating and said reversing motor receiving power only through said main switch, auxiliary means for operating said reversing switch to its opposite position whereby said reversing motor is plugged in reverse independently of the operation of the first motor, and means actuated by and instantly responsive to reverse movement of said reversing motor to disconnect said reversing motor from the power source thereby instantly stopping the movement of the said reversible motor.

6. The combination set forth in claim 5 characterized by the provision of means subsequently responsive to the action of said first motor to again effect operation of said reversing switch to its motor forward position to again start said reversing motor running forwardly.

7. A control circuit for two motors one of which is reversible including in combination three normally open solenoid operated switches; a starting switch connected in series with the control circuit of two of said solenoid switches to effect closing thereof and thereby the starting of said two motors; a normally closed double throw switch in the circuit to one of said two solenoid switches, said last named switch having a pair of contacts serially connected in a control circuit to said third solenoid switch, means for actuating said double throw switch to a position opening the circuit to the solenoid switch controlled thereby and for closing the circuit to said third named solenoid switch; and means actuated by the motor controlled by the said third switch for rendering the circuit to said third solenoid switch ineffective notwithstanding the completion of the circuit thereto previously established by the actuation of said double throw switch.

8. In a machine tool having two motors connected to propel elements thereof, the combination of electrical means for quickly stopping the motion of one of the motor propelled elements independently of the motion of the other comprising a system of power lines connected with both of said motors, a main switch in said system of lines normally connected to effect operation of both of said motors concurrently, electrically operated means independent of said main switch and in the control circuit of one of said motors for stopping the motion of one of said motors quickly, and means responsive to movement of the element propelled by the other of said motors for rendering said electrically operated means cyclically effective and ineffective.

9. In a machine tool having two electrical motors connected to propel elements thereof, the combination of means for bringing one of the motor propelled elements quickly to a position of rest independently of the motion of the other comprising a main switch for effecting operation of both of said motors concurrently, means in the circuit to one of said motors and operative independently of said main switch for stopping the motion of one of said motors quickly, said means including an auxiliary switch operatively responsive to the movement of one of the said elements to open the circuit of the motor to be stopped; and means responsive to a subsequent motion of the element propelled by the motor left in operation to again close the circuit to the stopped motor.

10. In a machine tool having two motors connected to propel elements thereof, the combination of means for quickly stopping the motion of one of the motor propeller elements independently of the motion of the other comprising a source of power for both of said motors, a main control element between said source and both of said motors adapted when actuated to effect operation of both of said motors concurrently, subordinate control means between said source and one of said motors adapted when actuated to effect quick stopping of the motion of one of said motors; means for actuating said subordinate control means at a preselected station in the travel or movement of one of the propelled elements; and additional means actuated subsequently by the motion of the element continuing in operation for again rendering said stopped motor effective as a propelling agent.

11. A mechanism for quickly stopping one of two motors connected in parallel with a main starting switch comprising a first motor and a second motor, an auxiliary switch connected in series with said main switch in the circuit to one of said motors, means for closing said main switch and said auxiliary switch concurrently whereby both motors start operating, means for operating said auxiliary switch to an open position independently of said first mentioned means thereby to bring one of said motors to rest; and means subsequently responsive to the operation of the other of said motors to again effect a closing of said auxiliary switch to thereby again start the motor controlled thereby in motion.

12. In a machine tool, a control mechanism for quickly stopping one of two motors, combining a first motor and a second motor connected in parallel to a forward starting switch, a second forward starting switch and a reverse starting switch in the circuit to one of said motors and both of said switches being in series with said first mentioned starting switch; means for closing both of said forward starting switches concurrently whereby both motors start operating; auxiliary means for operating said second forward starting switch to an open position and simultaneously said reverse starting switch to a closed position independently of said first mentioned means thereby quickly to preset one of said motors for reverse operation; and means responsive to reverse movement of the said motor to effect immediate opening of said reverse starting switch whereupon the said motor and elements propelled thereby remain at rest.

13. In a machine tool, a control mechanism for quickly stopping one of two motors, combining a first motor and a second motor each connected in series with starting switches; a stopping switch in the circuit to one of said motors; means for closing both of said starting switches concurrently whereby both motors start operating; auxiliary means for operating one of said starting switches to an open position and simultaneously said stopping switch to a closed position momentarily thereby quickly to bring one of said motors to rest; and means responsive to a subsequent motion of the motor continuing in operation to restore said starting switch for the stopped motor to closed position whereupon the said motor and elements propelled thereby resume operation.

14. In a machine tool the combination of a rotatable cutter adapted to be translated toward and away from the work and to perform a tooling operation during its forward travel and non-tooling operation on its return travel; an indexible work carrier arranged in cooperative position with respect to the movements of the cutter and adapted to support work to be operated upon by the cutter; power means for cyclically effecting translatory movement of the cutter toward and away from the work and thereafter index movements of the work carrier; separate power means for rotating the cutter to effect a tooling operation; and means operatively connected with the cutter translating means for stopping said separate power means at a predetermined point in the translatory movement of the cutter and for restarting the separate power means at another point in the translatory movement of the cutter.

15. A machine tool combining a rotatable and translatable cutter adapted to operate upon a work blank; an indexible work carrier arranged in cooperative position with respect to the movements of the cutter and adapted to support work to be operated upon by the cutter; power means for cyclically translating the cutter toward and away from the work and for effecting index movements of the work carrier between each two cycles of cutter translation; separate power means for rotating the cutter to effect a tooling operation; and means operatively connected with the cutter translating means for stopping the rotations of the cutter at one end of the cutter translatory movement and for restarting the cutter rotary motion at the other end of the cutter translatory movement, said translating and indexing power means continuing in operation during the period of stoppage of the cutter.

16. A machine tool combining a reversible cutting tool; an indexible work carrier adapted to support work to be operated upon by the said cutter; power means for rotating the cutter; power means including a train of mechanism for shifting the cutter to and from the work cyclically and a train of mechanism for indexing the work carrier at the end of a forward and return shifting movement of the cutter; means operated by the forward shifting movement of the cutter to initiate reverse rotations thereof and means operated by such reverse rotation to stop all rotary motion of the cutter, said last two mentioned means being constructed and arranged to function at the end of the forward shifting movement of the cutter; and means operated by the return shifting movement of the cutter to restart cutter rotation and concurrently therewith to initiate the work carrier indexing cycle.

17. In a machine tool the combination of a rotatable cutter adapted to be fed toward a workpiece and to perform a tooling operation thereon and thereafter returned to its initial starting position; an indexible work carrier arranged in cooperative position with respect to the feed movement of the cutter and adapted to support work to be operated upon by the cutter; drive means for cyclically effecting cutter feed, return and work carrier index movements; additional drive means for rotating the cutter during a tooling operation; and means operatively connected with the cutter feeding means for stopping said separate power means and thereby the rotary motion of the cutter at a predetermined point in the feed movement of the cutter and for continuing said cutter in a state of rest until the completion of the return movement thereof through the tooled work.

18. A gear cutting machine tool combining a rotatable cutter adapted to be cyclically shifted bodily toward and away from the work; an indexible work carrier arranged in cooperative position with respect to the movements of the cutter and adapted to support work to be operated upon by the cutter during forward shifting thereof; power means for cyclically effecting forward and return shifting movements of the cutter and index movements of the work carrier, means for rotating the cutter; and means controlled by the cutter shifting means for stopping said means for rotating the cutter at the end of its shifting movement toward the work and for starting the cutter rotating means in operation at the end of its shifting movement away from the work whereby the return travel of the cutter through the tooled work is effected while in a state of rest and restarted before being again shifted toward the work.

19. A machine tool combining a rotatable and shiftable element and an indexible element cooperating therewith, power means for shifting said shiftable element in forward and reverse directions relative to said indexible element and for cyclically indexing the said indexible element, additional power means for rotating said rotatable element, and electrically controlled means set in operation by the shifting motions of said rotatable element to stop the rotation thereof at the end of the forward shifting movement and to restart rotation of the rotatable element at the end of the reverse shifting movement; means also set in operation by and at the end of the reverse shifting movement of the said shiftable element to effect indexing of the indexible element, and means operable at the end of the indexing movement of the indexible element to effect forward shifting of said shiftable element whose rotary motion had previously been restarted.

20. A machine tool having in combination a rotatable and shiftable element, power means for rotating said element normally in one direction only, additional power means for shifting said element in forward and reverse directions cyclically, means operated by the forward shifting movement of the element to quickly stop rotation thereof at or before reverse shifting commences, and means operated by the reverse shifting of the said rotatable element to restart rotation thereof prior to the commencement of the forward shifting movement.

21. A control circuit including in combination a first solenoid, and a second solenoid, and a third solenoid; a main switch adapted to be actuated by said first solenoid and having a pair of its contacts in the circuit of each of said second and third solenoids; a control switch in the circuit to said first and second solenoids for energizing the former thereby to effect closing of said main switch and the completion of the circuit to the latter; a double throw switch in the circuits of said second and third solenoids having one pair of normally closed contacts in the circuit of the second solenoid and a pair of normally open contacts in the circuit of the third solenoid; means for actuating said double throw switch thereby to render one or the other of said second and third solenoids effective subsequent to the actuation of said main switch to closed position in response to energizing of said first solenoid; additional means for rendering one of said last named solenoids ineffective independently; and means to be actuated by said solenoid.

22. The combination set forth in claim 21 including switch means for breaking the circuit established for said first solenoid thereby to render all of said solenoids ineffective.

GRANGER DAVENPORT.